(12) United States Patent
Winkle et al.

(10) Patent No.: US 10,240,846 B2
(45) Date of Patent: Mar. 26, 2019

(54) SYSTEMS AND METHODS FOR DELIVERING PERISHABLE ITEMS

(71) Applicant: Walmart Apollo, LLC, Bentonville, AR (US)

(72) Inventors: David C. Winkle, Bella Vista, AR (US); Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/660,153

(22) Filed: Jul. 26, 2017

(65) Prior Publication Data

US 2018/0031296 A1 Feb. 1, 2018

Related U.S. Application Data

(60) Provisional application No. 62/367,376, filed on Jul. 27, 2016.

(51) Int. Cl.
*F25D 11/00* (2006.01)
*G05D 1/00* (2006.01)
(Continued)

(52) U.S. Cl.
CPC .......... *F25D 11/003* (2013.01); *B64C 39/024* (2013.01); *F25D 31/005* (2013.01);
(Continued)

(58) Field of Classification Search
CPC ........ F25D 2201/14; F25D 3/08; F25D 3/107; F25D 3/14; F25D 11/003; F25D 3/125;
(Continued)

(56) References Cited

U.S. PATENT DOCUMENTS

| 2,477,932 A | 8/1949 | Leighton |
| 3,450,196 A | 6/1969 | Bauer |

(Continued)

FOREIGN PATENT DOCUMENTS

| CA | 2117944 | 8/1998 |
| CN | 1810583 | 8/2006 |

(Continued)

OTHER PUBLICATIONS

Alexey Negrash; "Nano Liquid Ceramic Thermal Insulation Coating ( LCTIC ) Thermal Barrier Paint"; https://www.youtube.com/watch?v=X8F18IY9PmY; published on Jul. 16, 2013; pp. 1-6.

(Continued)

*Primary Examiner* — Frantz Jules
*Assistant Examiner* — Lionel Nouketcha
(74) *Attorney, Agent, or Firm* — Fitch, Even, Tabin & Flannery, LLP

(57) ABSTRACT

In some embodiments, apparatuses and methods are provided herein useful to delivering and maintaining perishable items within a certain temperature range during delivery. In some embodiments, there is provided a system for transporting merchandise including: a container for transporting merchandise within a predetermined temperature range in a delivery vehicle along a delivery route from a source location to a destination location, the container including: a merchandise storage area receiving merchandise and a coolant; an insulation compartment adjacent the merchandise storage area; a temperature sensor measuring the temperature in the merchandise storage area at predetermined time intervals during transport; and a control circuit configured to receive the temperature measurements from the temperature sensor during transport and to modify the insulation characteristics of the container during transport in response to (Continued)

the temperature measurements to maintain the merchandise within the predetermined temperature range.

15 Claims, 6 Drawing Sheets

(51) Int. Cl.
*G06Q 10/08* (2012.01)
*B64C 39/02* (2006.01)
*F25D 31/00* (2006.01)
*F25D 3/10* (2006.01)
*F25D 3/08* (2006.01)
*F25D 3/14* (2006.01)

(52) U.S. Cl.
CPC ......... *G05D 1/0027* (2013.01); *G06Q 10/083* (2013.01); *B64C 2201/128* (2013.01); *F25D 3/08* (2013.01); *F25D 3/107* (2013.01); *F25D 3/14* (2013.01); *F25D 2201/14* (2013.01); *F25D 2700/12* (2013.01)

(58) Field of Classification Search
CPC .............. F25D 31/005; B65D 81/2007; B65D 81/2038; B64C 2201/128; B64C 39/024
See application file for complete search history.

(56) References Cited

U.S. PATENT DOCUMENTS

| | | |
|---|---|---|
| 3,726,106 A | 4/1973 | Jaeger |
| 3,831,389 A | 8/1974 | Lipona |
| 3,961,925 A | 6/1976 | Rhoad |
| 4,462,461 A | 7/1984 | Grant |
| 4,823,554 A | 4/1989 | Trachtenberg |
| 4,936,100 A | 6/1990 | Leppa |
| 5,290,580 A | 3/1994 | Floyd |
| 5,337,579 A | 8/1994 | Saia |
| 5,669,233 A | 9/1997 | Cook |
| 5,813,454 A | 9/1998 | Potter |
| 5,826,432 A | 10/1998 | Ledbetter |
| 5,908,649 A | 6/1999 | Floyd |
| 6,003,322 A | 12/1999 | Graham |
| 6,029,457 A | 2/2000 | Neeser |
| 6,209,343 B1 * | 4/2001 | Owen ...................... A01N 1/02 252/67 |
| 6,244,458 B1 | 6/2001 | Frysinger |
| 6,382,141 B1 | 5/2002 | Maynor |
| 6,390,378 B1 | 5/2002 | Briscoe |
| 6,412,287 B1 | 7/2002 | Hughes |
| 6,427,475 B1 | 8/2002 | Defelice |
| 6,536,189 B1 | 3/2003 | Murray |
| 6,551,182 B2 | 4/2003 | Caracciolo |
| 6,555,789 B2 | 4/2003 | Owens |
| 6,584,797 B1 | 7/2003 | Smith |
| 6,732,534 B2 | 5/2004 | Spry |
| 6,763,666 B2 | 7/2004 | Fong |
| 6,789,391 B2 | 9/2004 | Graham |
| 6,817,202 B1 | 11/2004 | Anthony |
| 6,968,711 B2 | 11/2005 | Smith |
| 7,073,338 B2 | 7/2006 | Harwood |
| 7,130,771 B2 | 10/2006 | Aghassipour |
| 7,310,967 B2 | 12/2007 | Aragon |
| 7,407,065 B2 | 8/2008 | Hooks |
| 7,650,757 B2 | 1/2010 | Bhatti |
| 7,784,301 B2 | 8/2010 | Sasaki |
| 7,849,708 B2 | 12/2010 | Goncharko |
| 7,913,511 B2 | 3/2011 | Meyer |
| 8,151,599 B2 | 4/2012 | Sixt |
| 8,375,730 B2 | 2/2013 | Haarmann |
| 8,600,903 B2 | 12/2013 | Eller |
| 8,783,002 B2 | 7/2014 | Bowden |
| 8,881,540 B1 | 11/2014 | Barakat |
| 8,905,744 B2 | 12/2014 | Fruth |
| 8,948,935 B1 | 2/2015 | Peeters |
| 9,163,863 B1 | 10/2015 | Armstrong |
| 9,290,313 B2 * | 3/2016 | De Lesseux ......... B65D 81/389 |
| 9,310,279 B2 | 4/2016 | Crombie |
| 1,572,458 A1 | 10/2017 | Winkle |
| 2002/0040586 A1 | 4/2002 | Glenk |
| 2003/0014993 A1 | 1/2003 | Smith |
| 2003/0163225 A1 | 8/2003 | Hanson |
| 2004/0226309 A1 | 11/2004 | Broussard |
| 2004/0243353 A1 | 12/2004 | Aghassipour |
| 2006/0208881 A1 * | 9/2006 | Suzuki ..................... A01N 1/02 340/539.27 |
| 2007/0018791 A1 | 1/2007 | Johnson |
| 2007/0193297 A1 | 8/2007 | Wilson |
| 2008/0060376 A1 * | 3/2008 | Espinosa ................. A47F 3/001 62/331 |
| 2008/0128095 A1 | 6/2008 | Van Zutven |
| 2008/0242752 A1 | 10/2008 | Delaviz |
| 2008/0260303 A1 | 10/2008 | De Lesseux |
| 2008/0282705 A1 | 11/2008 | Hue |
| 2008/0291033 A1 * | 11/2008 | Aghassipour .......... G06Q 10/08 340/584 |
| 2008/0308452 A1 | 12/2008 | Eller |
| 2010/0047546 A1 | 2/2010 | Malshe |
| 2010/0064698 A1 | 3/2010 | Schabron |
| 2010/0251731 A1 | 10/2010 | Bergida |
| 2011/0186591 A1 | 8/2011 | Pfister |
| 2012/0111044 A1 | 5/2012 | Chen |
| 2012/0210677 A1 | 8/2012 | Proskin |
| 2012/0227856 A1 | 9/2012 | Sinacori |
| 2013/0020309 A1 | 1/2013 | Tattam |
| 2013/0045870 A1 | 2/2013 | Rogers |
| 2013/0073477 A1 | 3/2013 | Grinberg |
| 2013/0111937 A1 | 5/2013 | Hendrix |
| 2013/0333396 A1 | 12/2013 | Handley |
| 2014/0032034 A1 | 1/2014 | Raptopoulos |
| 2014/0144161 A1 | 5/2014 | Pointer |
| 2014/0157797 A1 | 6/2014 | Kovalick |
| 2014/0216101 A1 | 8/2014 | Dubreuil |
| 2015/0006005 A1 | 1/2015 | Yu |
| 2015/0120094 A1 | 4/2015 | Kimchi |
| 2015/0120597 A1 | 4/2015 | Dertadian |
| 2015/0192475 A1 | 7/2015 | Eisenstadt |
| 2015/0291868 A1 | 10/2015 | Rajagopalan |
| 2016/0016664 A1 | 1/2016 | Basuni |
| 2016/0107750 A1 | 4/2016 | Yates |
| 2016/0124435 A1 | 5/2016 | Thompson |
| 2016/0159496 A1 | 6/2016 | O'Toole |
| 2017/0203857 A1 * | 7/2017 | O'Toole ................... B64F 1/32 |
| 2017/0336125 A1 | 11/2017 | Winkle |
| 2017/0336126 A1 | 11/2017 | Winkle |
| 2017/0351999 A1 | 12/2017 | Winkle |
| 2017/0363349 A1 | 12/2017 | McHale |

FOREIGN PATENT DOCUMENTS

| | | |
|---|---|---|
| CN | 202345497 | 7/2012 |
| CN | 103723001 | 4/2014 |
| CN | 203699065 | 7/2014 |
| EP | 2604956 | 6/2013 |
| EP | 2614729 | 7/2013 |
| EP | 2158814 | 8/2013 |
| GB | 1198354 | 7/1970 |
| WO | 98031608 | 7/1998 |
| WO | 1999064818 | 12/1999 |
| WO | 0108983 | 2/2001 |
| WO | 03013318 | 4/2003 |
| WO | 2006072210 | 7/2006 |
| WO | 2006124149 | 4/2008 |
| WO | 2010044107 | 4/2010 |
| WO | 2011061431 | 5/2011 |
| WO | 2013063374 | 5/2013 |
| WO | 2017201118 | 11/2017 |
| WO | 2017201230 | 11/2017 |

(56) References Cited

OTHER PUBLICATIONS

Liu Jiang; "Wall thermal insulation nano-coating"; https://www.youtube.com/watch?v=yF4NnNTPITQ; published on Nov. 14, 2015; pp. 1-17.
PCT; App. No. PCT/US2017/033016; International Search Report and Written Opinion dated Jan. 5, 2018.
PCT; App. No. PCT/US2017/033025 ; International Search Report and Written Opinion dated Aug. 16, 2017.
PCT; App. No. PCT/US2017/033246; International Search Report and Written Opinion dated Aug. 23, 2017.
PCT; App. No. PCT/US2017/054843; International Search Report and Written Opinion dated Dec. 18, 2017.
SBC Magazine; "Spray 'Nano-Insulation' Applied to Windows During Energy Retrofit"; https://www.sbcmag.info/news/2016/oct/spray-nano-insulation-applied-windows-during-energy-retrofit; published on Oct. 17, 2016; pp. 1-5.
U.S. Appl. No. 15/598,699, filed May 18, 2017, David C. Winkle.
U.S. Appl. No. 15/598,718, filed May 18, 2017, David C. Winkle.
U.S. Appl. No. 15/611,487, filed Jun. 1, 2017, David C. Winkle.
U.S. Appl. No. 15/624,211, filed Jun. 15, 2017, Brian G. McHale.
U.S. Appl. No. 15/660,153, filed Jul. 26, 2017, David C. Winkle.
U.S. Appl. No. 62/403,909, filed Oct. 4, 2016, David C. Winkle.
PCT; App. No. PCT/US2017/033236; International Search Report and Written Opinion dated Aug. 14, 2017.
AGA; "Transportation Cooling"; http://www.aga.se/en/processes_ren/freezing_cooling/transportation_cooling/index.html; Available at least as early as Jan. 21, 2016; pp. 1-3.
Fedex Express; "Packaging Perishable Shipments"; Retrieved on May 2015; pp. 1-8.
Krapfl, Mike; "Researcher working to save energy with nanotechnology insulation", Phys.org, http://phys.org/news/2014-12-energy-nanotechnology-insulation.html, Dec. 2, 2014, pp. 1-4.
PCT; App. No. PCT/US2017/035631; International Search Report and Written Opinion dated Aug. 22, 2017.
PCT; App. No. PCT/US2017/037698; International Search Report and Written Opinion dated Sep. 1, 2017.
PCT; App. No. PCT/US2017/042769; International Search Report and Written Opinion dated Sep. 27, 2017.
Prevenslik, T.; "QED Cooling of Structures by Nanoscale Coatings", Proceedings of the 5th International Conference on Nanostructures, Mar. 6-9, 2014, pp. 1-3.
Raman, Aaswath, et al.; "Photonic Radiative Cooling", 2015 Technology Application for Cleantech to Market (C2M), 2015, pp. 1-4.
Stauth, David; "Nanotech yields major advance in heat transfer, cooling technologies", Oregon State University, http://oregonstate.edu/ua/ncs/archives/2010/jun/nanotech-yields-major-advance-heat-transfer-cooling-technologies, Jun. 9, 2010, pp. 1-3.
Wikipedia; "Pot-in-pot refrigerator"; https://web.archive.org/web/20150606152436/https://en.wikipedia.org/wiki/Pot-in-pot_refrigerator; Jun. 2015; pp. 1-2.

\* cited by examiner

SYSTEMS AND METHODS FOR DELIVERING PERISHABLE ITEMS

CROSS-REFERENCE TO RELATED APPLICATION

This application claims the benefit of U.S. Provisional Application No. 62/367,376, filed Jul. 27, 2016, which is incorporated herein by reference in its entirety.

TECHNICAL FIELD

This invention relates generally to delivering perishable items, and more particularly, to delivering perishable items and maintaining them within a certain temperature range during delivery.

BACKGROUND

In a variety of settings requiring transport and delivery of items, one challenge is to deliver perishable items or merchandise (such as medicine or grocery produce) that must be maintained within a certain temperature range. If the perishable items are not maintained within this temperature range, they may spoil, lose effectiveness, or otherwise be unsuitable for use by customers. In this context, a certain amount of coolant and insulation may be needed in a delivery container in order to maintain the desired temperature of these perishable items or merchandise.

Accordingly, it would be desirable to provide a delivery container that includes the proper amount of coolant and/or insulation. More specifically, under one approach, it would be desirable to provide a delivery container where the insulation characteristics could be modified during transport in order to maintain the desired temperature range within the container. Under another approach, it would be desirable to provide a delivery container where various combinations of coolant and insulation could be determined prior to transport in order to provide flexibility in making deliveries.

BRIEF DESCRIPTION OF THE DRAWINGS

Disclosed herein are embodiments of systems, apparatuses and methods pertaining to delivering perishable items and maintaining them within a certain temperature range during delivery. This description includes drawings, wherein.

Figure 1:
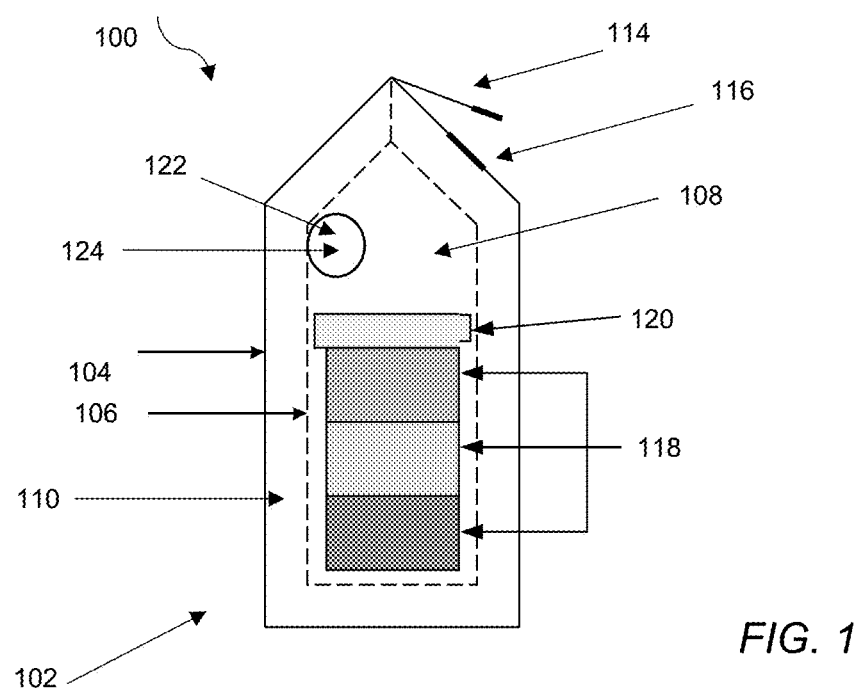
FIG. 1 is a schematic diagram of a delivery container in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to delivering perishable items and maintaining them within a certain temperature range during delivery. In one form, there is provided a system for transporting merchandise including: a container configured to transport merchandise within a predetermined temperature range in a delivery vehicle along a delivery route from a source location to a destination location in the delivery vehicle, the container including: a merchandise storage area configured to receive merchandise and a coolant; an insulation compartment adjacent the merchandise storage area; a first temperature sensor configured to measure the temperature in the merchandise storage area at predetermined time intervals during transport from the source location to the destination location; and a control circuit configured to receive the temperature measurements from the first temperature sensor during transport and to modify the insulation characteristics of the container during transport in response to the temperature measurements to maintain the merchandise within the predetermined temperature range.

In some forms, the delivery vehicle may include an aerial drone. Further, the container may include: an outer bag with an interior divided into the merchandise storage area and the insulation compartment; an inner bag disposed within the interior of the outer bag and defining the merchandise storage area; and wherein the outer bag and the inner bag define the insulation compartment therebetween. In addition, the coolant may include dry ice. Also, the insulation compartment may be configured to retain a variable amount of insulation.

In some forms, the system may further include: a second temperature sensor configured to measure the temperature outside of the container at predetermined time intervals during transport from the source location to the destination location; a valve operable between an open position allowing air to flow from outside the container to inside the container and a closed position in which air flow from outside the container is blocked; wherein the control circuit is configured to: receive temperature measurements from the second temperature sensor during transport; compare temperature measurements of the first sensor with temperature measurements of the second sensor; and if a predetermined number of temperature measurements of the second sensor exceed a predetermined number of temperature measurements of the first sensor, modify the insulation characteristics of the container by allowing outside air into the container through the valve.

In some forms, the insulation compartment may be partially evacuated to create a partial vacuum. In addition, the system may further include a vacuum pump, wherein the control circuit is configured to: monitor the temperature in the merchandise storage area; and actuate the vacuum pump to modify the partial vacuum to modify the insulation characteristics of the insulation compartment during transport in response to the monitored temperature.

In some forms, the system may further include: at least one sensor configured to measure environmental conditions outside the container during transport; a computing device remote from the container and communicatively coupled to the control circuit; the control circuit configured to receive sensor measurements from the at least one sensor and transmit them to the computing device during transport; and the computing device configured to receive the sensor measurements from the control circuit, to make a determination regarding modification of the insulation characteristics, and to transmit the modification of the insulation characteristics to the control circuit. Also, the environmental conditions may include at least one of temperature, wind chill, heat index, amount of sunlight, elevation of route, humidity, and wind speed.

In another form, there is provided a method for transporting merchandise including: providing a delivery vehicle; providing a container configured to transport merchandise in the delivery vehicle, the container including: a merchandise storage area configured to receive merchandise and a coolant; and an insulation compartment adjacent the merchandise storage area; transporting the container in the delivery vehicle along a delivery route from a source location to a destination location; measuring the temperature in the merchandise storage area at predetermined time intervals during transport from the source location to the destination location; and by a control circuit, receiving the temperature measurements during transport and modifying the insulation characteristics of the container during transport in response to the temperature measurements to maintain the merchandise within a predetermined temperature range.

In another form, there is provided a system for transporting merchandise including: a container configured to transport merchandise within a predetermined temperature range in a delivery vehicle along a delivery route from a source location to a destination location in the delivery vehicle, the container including: a merchandise storage area configured to receive merchandise and a variable amount of coolant; an insulation compartment adjacent the merchandise storage area and configured to receive a variable amount of insulation; and a control circuit configured to calculate prior to transport a plurality of combinations of the amount of coolant and the amount of insulation required to maintain the merchandise within the predetermined temperature range.

Referring to FIG. 1, there is shown a delivery container 100 that may be used in conjunction with the systems and methods described herein. It should be understood that this delivery container 100 is just one example of a container that may be used and that many other types, shapes, and forms of delivery containers may also be used. The delivery container 100 is used to store the merchandise (such as perishable items like medicine or chilled or frozen grocery produce) that is being transported and that is to be maintained within a certain temperature range. More specifically, the delivery container 100 is configured to transport merchandise within a predetermined temperature range in a delivery vehicle along a delivery route from a source location to a destination location in the delivery vehicle. For example, the delivery container 100 may be used for home delivery of a cooled retail item.

In this embodiment, the delivery container 100 may be in the form of a two layer bag 102 composed of an outer bag 104 and an inner bag 106. The outer bag 104 has an interior that is divided into a merchandise storage area 108 and an insulation compartment 110. The inner bag 106 is disposed within the interior of the outer bag 104 and defines the merchandise storage area 108. As can be seen, the insulation compartment 110 may be in the form of an interstitial space 112 that is between the outer bag 104 and the inner bag 106 and that is adjacent the merchandise storage area 108. The delivery container 100 may also include a Velcro® flap 114 that engages a Velcro® strip 116 to open and close the container 100, although other access and fastening mechanisms may be used.

Figure 2:
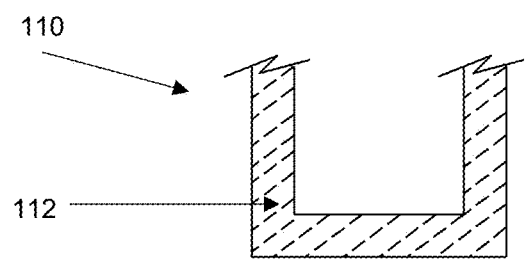
FIG. 2 is a schematic diagram of an interstitial layer of a delivery container in accordance with several embodiments.

Further, as described further below, the interstitial space 112 may be filled with any of various insulating materials, such as an insulation material, air, vacuum, partial vacuum, or some combination thereof, to maintain the merchandise storage area 108 within a certain temperature range. In this form in FIG. 1, it is contemplated that the interstitial space 112 may be filled with an insulation material. FIG. 2 shows a partial view of the interstitial space 112 with shading indicating that it is filled with an insulation material (such as various types of foams (including polyurethane and polystyrene), fiberglass, gas, etc.). In one form, the insulation compartment 110 may be configured to retain a variable amount of insulation material, depending on the needs of the transport.

The merchandise storage area 108 generally holds the merchandise 118 (such as, for example, frozen products) and a coolant 120 to maintain the merchandise storage area 108 at a desired, cool temperature. In one form, the coolant may be dry ice that is arranged above and/or around the merchandise 118, although other types and forms of coolant may be used (such as ice; water; frozen gel packs; or liquid nitrogen, hydrogen, or carbon dioxide; etc.). The coolant may take advantage of the phase change between solid/liquid/gas. The merchandise storage area 108 also includes a temperature sensor 122 that measures the temperature in the merchandise storage area 108 at predetermined time intervals during transport from the source location to the destination location. The delivery container 100 also includes a control circuit 124 (described further below), and in one form, the temperature sensor 122 and control circuit 124 are collectively part of a unitary structure. It should be understood that temperature sensor 122 and control circuit 124 may also constitute separate structures.

The control circuit 124 receives temperature measurements from the temperature sensor 122 during transport and modifies the insulation characteristics of the insulation compartment 110 during transport in response to the temperature measurements to maintain the merchandise 118 within the desired temperature range. This may be done in various ways. As one example, as temperature rises, the coolant 120 (such as dry ice) may be sublimated into a gas, which can then be vented into the insulation compartment 110 or outside the delivery container 100. Alternatively, where the insulation material is in the form of a gas (in whole or in part), some of the gas may be released from the container 100 during transport. So, if the temperature reaches a certain temperature threshold (indicating that the temperature is getting too high), the control circuit 124 may be configured to trigger venting of some of the gas into the insulation compartment 110 or outside the delivery container 100. If the temperature does not reach this threshold, the gas would not be vented. It is contemplated that other coolants may have properties and characteristics that would make them desirable in certain circumstances and for certain temperature requirements.

As used herein, the term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 124 may be configured (for example, by using corresponding programming stored in a memory as will be well understood by those skilled in the art) to carry out one or more of the steps, actions, and/or functions described herein.

It is contemplated that the delivery container 100 may be transported in different types of delivery vehicles to a destination. For example, the delivery container 100 may be transported in a delivery truck or in an aerial drone. In one form, it may be desirable to use a truck and to keep items cool during transport without having to cool the entire truck. In another form, it is contemplated that transporting the delivery container 100 via an aerial drone may expose the delivery container 100 to environmental conditions that may be taken into account when maintaining the merchandise storage area 108 within the desired temperature range, as described further below.

Figure 3:
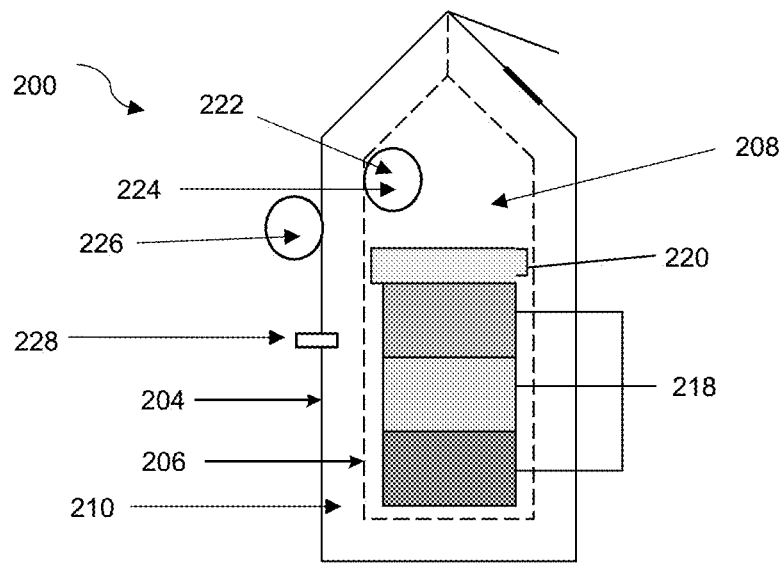
FIG. 3 is a schematic diagram of a delivery container in accordance with some embodiments.

Referring to FIG. 3, there is shown a slightly modified delivery container 200 from that shown in FIG. 1. As can be seen, this delivery container 200 generally includes the same general structure and components as container 100. However, in this form, as described further below, the delivery container 200 includes additional structure to allow potential cooling by air outside of the container 200 if circumstances are appropriate.

The delivery container 200 includes an outer bag 204, an inner bag 206, and an insulation compartment 210 in between these bags. It also includes a merchandise storage 208 that generally holds the merchandise 218 and the coolant 220 to maintain the merchandise storage area 208 within the desired temperature range. The merchandise storage area 208 further includes a first temperature sensor 222 that measures the temperature in the merchandise storage area 208 at predetermined time intervals during transport. The delivery container 200 also includes a control circuit 224.

In this form, the delivery container 200 may include a second temperature sensor 226 that measures the temperature outside of the container 200 at predetermined time intervals during transport from the source location to the destination location. It may also include a valve 228 that may be adjusted between an open position allowing air to flow from outside the container 200 into the container (into either the insulation compartment 210 or merchandise storage area 208) and a closed position in which air flow from outside the container 200 to the interior of the delivery container 200 is blocked. The control circuit 224 may be in wired or wireless communication with the second temperature sensor 226 and valve 228. In this form, it is contemplated that the control circuit 224 may control the operation of the valve 228 depending on the respective temperatures. More specifically, the control circuit 224 may receive temperature measurements from the second temperature sensor 226 during transport; compare temperature measurements of the first temperature sensor 222 with temperature measurements from the second sensor 226; and if a certain number of temperature measurements from the second sensor 226 exceed a predetermined number of temperature measurements from the first sensor 222, allow outside air into the delivery container 200 through the valve 228.

In one form, it is contemplated that the delivery container 200 may include multiple valves 228 to control the air flow into and out of the container 200. For example, the delivery container 200 may have an intake valve or check valve that is arranged to permit air flow in one direction only, i.e., into the delivery container 200. The intake valve may be positioned to take advantage of the direction of movement of the delivery vehicle. Where the delivery vehicle is an aerial drone, the intake valve, for example, may be disposed on a forward facing surface exposed to onrushing air flow so as to facilitate the intake of relatively cool air during flight. Further, the delivery container 200 may have an exhaust valve or check valve that is arranged to permit air flow in one direction only, i.e., out of the delivery container 200. The exhaust valve may also be positioned to take advantage of movement of the delivery vehicle. Where the delivery vehicle is an aerial drone, the exhaust valve, for instance, may be disposed on a rearward facing surface not exposed to onrushing air flow so as to facilitate exhaust during flight. The positioning of the valves 228 may be arranged to take advantage of differences in pressure at various locations about the aerial drone during flight. In addition, the control circuit 224 may coordinate the operation of the valves 228 such that the intake and exhaust each occur so as to optimize the cooling of the merchandise 218 being transported. As indicated above, the intake and exhaust valves may be coupled to the merchandise storage area 208 and/or the insulation compartment 210.

Figure 4:
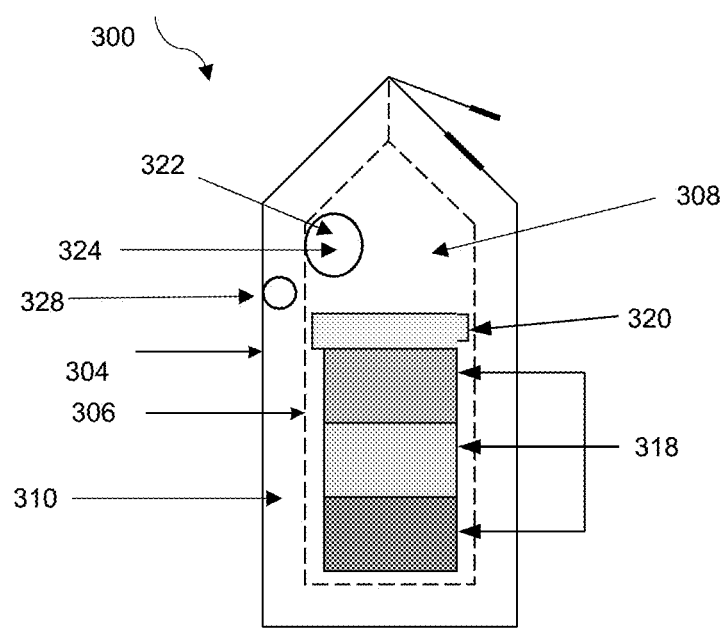
FIG. 4 is a schematic diagram of a delivery container in accordance with some embodiments.

In FIG. 4, there is shown another slightly modified delivery container 300 from that shown in FIGS. 1 and 3. As can be seen, this delivery container 300 generally includes the same general structure and components as container 100. However, in this form, as described further below, the delivery container 300 includes additional structure to allow adjustment of a partial vacuum in the insulation compartment 308 to modify the insulation characteristics during transport.

In this form, the delivery container 300 may include a rigid or flexible outer wall 306 and/or a rigid or flexible inner wall 304. The inner wall 304 defines a merchandise storage 310 within its interior, and as above, this merchandise storage area 310 contains the merchandise 318 and the coolant 320. The merchandise storage area 310 also includes a temperature sensor 322 for measuring the temperature in the merchandise storage area 308 at desired time intervals during transport of the merchandise 318.

The outer wall 306 and the inner wall 304 define an insulation compartment 310 between them. In one form, the insulation material may constitute (in whole or in part) air, some other gas, or some combination of gases. In this form, it is generally contemplated that the insulation compartment 310 is partially evacuated to create a partial vacuum, whose insulation characteristics are used to maintain the merchandise storage area 308 within the desired temperature range. The delivery container 300 includes a vacuum pump that is preferably coupled to a pressure sensor (not shown) and to a power source (not shown), such as a battery, which may be part of a unitary structure. The vacuum pump 328 is coupled to and controlled by a control circuit 324. In this form, the control circuit 324 monitors the temperature in the merchandise storage area 308 and activates the vacuum pump 328 to increase or decrease the partial vacuum to modify the insulation characteristics of the insulation compartment 310 during transport in response to the monitored temperature.

In addition, in one form, it is contemplated that the delivery container 300 may include one or more valves to control air flow into and out of the container 300 possibly in coordination with the vacuum pump 328. As explained above, in one form, the delivery container 300 may include an intake valve and an exhaust valve that may be positioned at various locations about the aerial drone to take advantage of differences in pressure during flight. The control circuit 324 may coordinate the operation of the valves such that the intake and exhaust each occur so as to create the vacuum or modify the characteristics of the partial vacuum. In one form, the intake and exhaust valves may be coupled to the insulation compartment 310.

Figure 5:
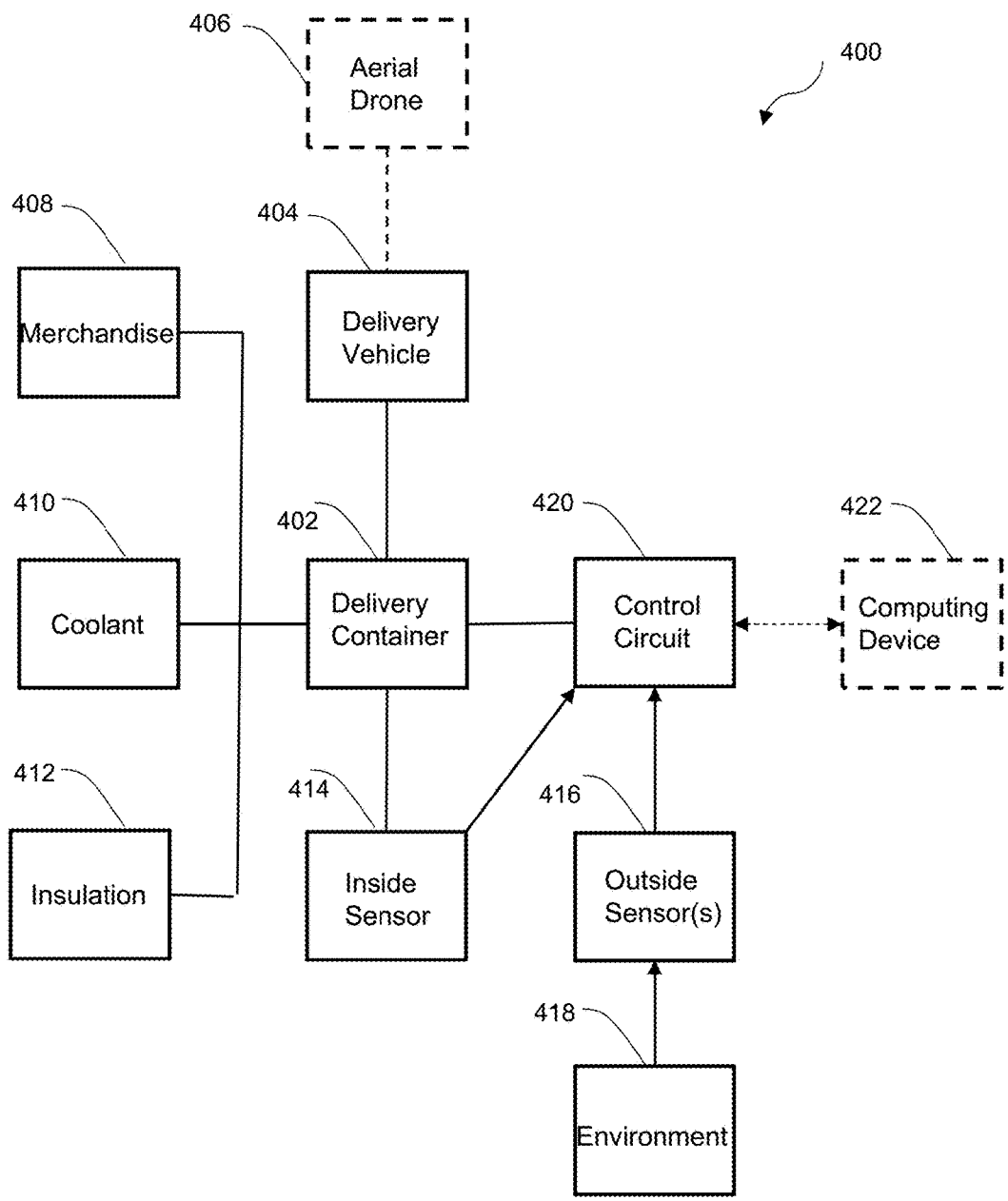
FIG. 5 is a block diagram of a system for transporting merchandise in accordance with some embodiments.

Referring to FIG. 5, there is shown a system 400 that may use one of the delivery containers 100, 200, 300 described above. The system 400 generally contemplates taking into account some environmental conditions along the route taken by a delivery vehicle transporting the container. In one form, the system 400 may transmit these environmental conditions in real time to a remote computing device for adjustment of the insulation characteristics of the container during transport.

The system 400 includes a delivery container 402. It is contemplated that the delivery container 402 is transported on a delivery vehicle 404 from a source location to a destination location. One type of delivery vehicle 404 that is contemplated is an aerial drone 406, although other vehicles may also be used. Given the nature of its flight travel, it is contemplated that an aerial drone 406 may be subject to a variety of environmental conditions along its route that should be considered. A change in environmental conditions (or unexpected environmental conditions) may have a deleterious effect on the temperature inside the delivery container 402 and may cause the temperature to fall outside of the desired temperature range. Alternatively, it may be desirable to utilize favorable outside environmental conditions to extend the lifetime of the coolant.

In one form, it is contemplated that the delivery container 402 will include a merchandise storage area that holds merchandise 408 and a coolant 410 and an insulation compartment 412 that is adjacent to the merchandise storage area. The delivery container may be in the form of one of the embodiments of delivery containers 100, 200, 300 addressed above. However, numerous delivery containers are known, and it is also contemplated that other types and structurally-arranged delivery containers may be used than those embodiments shown herein.

Further, it is contemplated that the system 400 includes an inside temperature sensor 414 that measures the temperature in the merchandise storage area at pre-set time intervals during transport. It is also contemplated that the system may include one or more outside sensors 416 that measures one or more environmental conditions 418 outside of the delivery container 402. As should be evident, it is contemplated that the delivery container 402 is exposed to these environmental conditions 418, such as, for example, an aerial drone 406 transporting the container 402 with, at least, a portion projecting from the drone 406. In addition, in one form, it is contemplated that these environmental conditions 418 may include, for example, temperature, wind chill, heat index, amount of sunlight, elevation of route, humidity, and wind speed, and the outside sensor(s) 416 may measure some of these environmental conditions 418.

In one form, these inside and outside sensor measurements are taken at periodic intervals and are transmitted to a control circuit 420. The control circuit 420 may compare these measurements and may determine if modification of the insulation characteristics of the insulation compartment 412 is required. For example, the control circuit 420 may make a simple comparison of the inside and outside temperature and may be configured to take real time action during transport based on a certain relationship of these inside and outside temperature measurements to one another.

In another form, the system 400 may include a computing device 422 remote from the container 402 and in wireless communication with the control circuit 420. The control circuit 420 may transmit the inside and outside sensor measurements to the computing device 422 during transport. The computing device 422 may be configured to determine based on the measurements if modification of the insulation characteristics is required to maintain the predetermined temperature range during transport and, if so, to transmit the modification of the insulation characteristics to the control circuit 420. It is contemplated that the computing device 422 may be able to make calculations based on these sensor measurements. In addition, the computing device 422 may access databases or other external sources providing additional information that may be used in such calculations, such as the environmental conditions that had been anticipated at the beginning of the transport (and that may have been the basis for the original calculations of the amount of coolant and the insulation required) and environmental conditions that are forecasted for the remainder of the delivery route.

The computing device 422 may use the measured environmental conditions (and any additional external data) to predict the effect of these factors on the remainder of transport and to instruct real-time adjustment of insulation characteristics accordingly to the control circuit 420. For example, the measured wind speed may be higher than anticipated, which may lead to a longer than anticipated transport. In turn, this result may suggest that the amount of coolant may not be sufficient and that modification of the insulation characteristics may be warranted. Further, as should be evident, the outside sensor(s) 416 may measure a combination of environmental conditions. The computing device 422 may determine the effect of each of these environmental conditions and instruct adjustment of insulation characteristics based on this combination of environmental conditions. Further, it may be desirable to utilize environmental conditions to extend the lifetime of the coolant, such as by taking advantage of relatively low temperatures outside of the delivery container 400.

Figure 6:
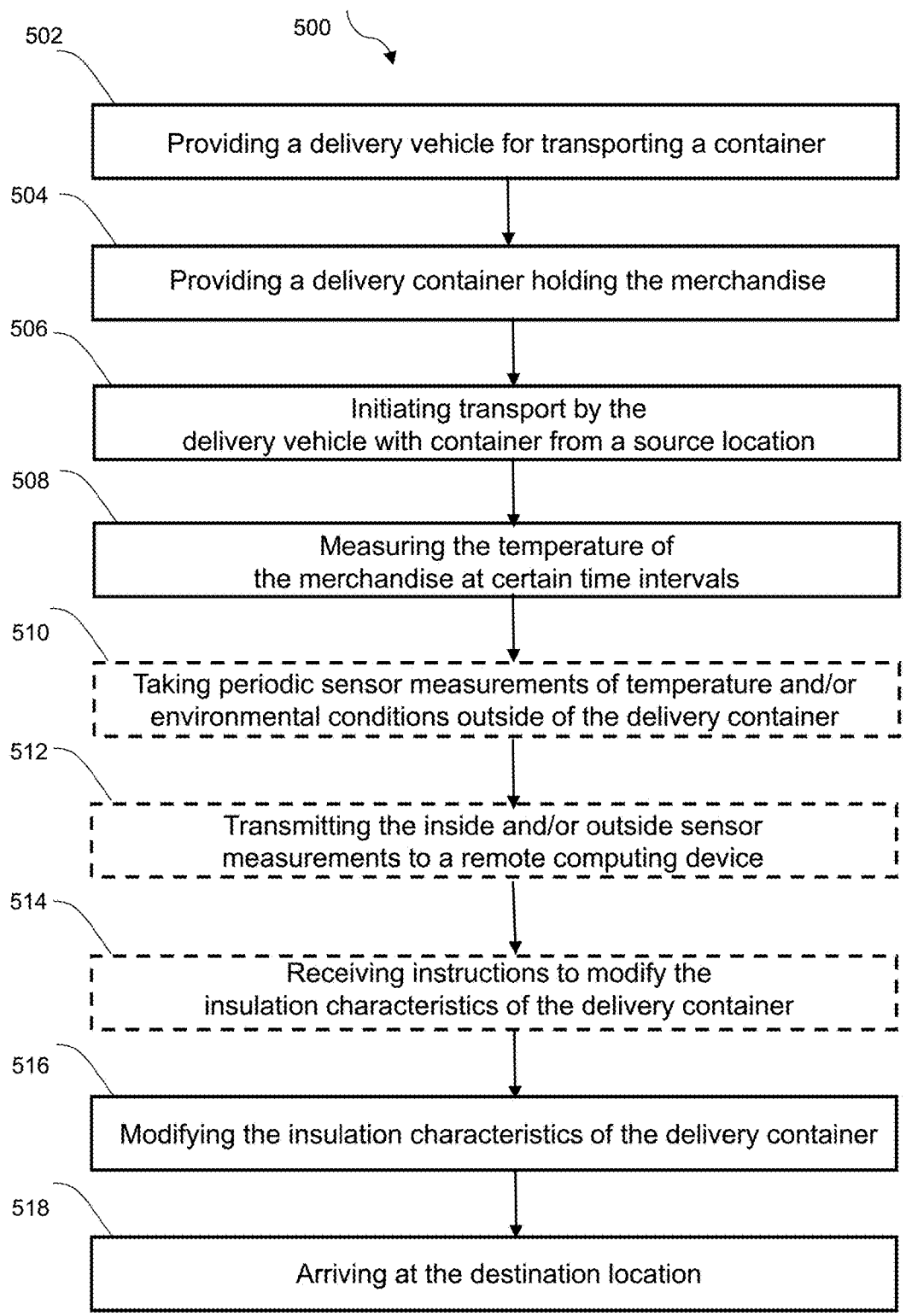
FIG. 6 is a flow diagram of a process for transporting merchandise in accordance with several embodiments.

Referring to FIG. 6, there is shown a process 500 for transporting merchandise (such as perishable items) that may use one or more of the systems/delivery containers 100, 200, 300, 400 (and their components) described above. It is generally contemplated that the process 500 involves use of a container for delivering merchandise to a desired destination. The process 500 further involves monitoring the temperature of the merchandise during transport to make sure it stays within a desired temperature range and adjusting insulation characteristics of the delivery container, as necessary.

At blocks 502 and 504, a delivery vehicle and delivery container are provided for transporting the merchandise along a delivery route from a source location to a destination location. In one form, it is contemplated that the delivery vehicle may be an aerial drone, although other delivery vehicles may also be used. In addition, in one form, it is contemplated that one of the delivery containers 100, 200, 300 described above may be used having a merchandise storage (holding the merchandise and a coolant) and an insulation compartment next to the merchandise storage area. However, it should be understood that other types of delivery containers may also be used. At block 506, the delivery vehicle with delivery container depart from the source location.

At block 508, the temperature of the merchandise is measured at certain time intervals, such as, for example, regular intervals of five minutes. It is generally contemplated that these temperature measurements are continued during the entire transport from the source location to the delivery location. These inside temperature measurements are transmitted to a control circuit, which may use this input in determining whether the insulation characteristics should be adjusted (see block 516). For example, as described above, the control circuit may vent sublimated coolant or may adjust a partial vacuum in the insulation compartment.

Optionally, at block 510, it is contemplated that the environmental conditions outside of the delivery container may be measured. It is generally contemplated that periodic sensor measurements of an environmental condition may be taken, such as regular periodic measurements every five minutes. These environmental conditions may include such conditions as temperature, wind chill, heat index, amount of sunlight, elevation of route, humidity, and wind speed. For example, in one form, temperature measurements outside of the delivery container may be taken and transmitted to the control circuit. In turn, the inside and outside temperature measurements may be compared, and the control circuit may take action (such as allowing outside air into some portion of the container) in response to this comparison.

Optionally, in another form, it is contemplated that the measured environmental conditions may be transmitted to a remote computing device for analysis, possibly in combination with additional information from external sources. At block 512, the control circuit may transmit the inside and/or outside sensor measurements to the remote computing device. It is contemplated that the computing device may also consider additional information, such as the environmental conditions that had been anticipated at the beginning of the transport and environmental conditions that are forecasted for the remainder of the delivery route. At block 514, once the computing device has completed its calculations, it may transmit instructions/commands back to the control circuit. At block 516, the insulation characteristics of the container may be modified in response to the instructions received by the control circuit.

It is generally contemplated that the process 500 shown in FIG. 6 may be an iterative process. It is contemplated that sensor measurements will be taken periodically and that the control circuit will respond in real time during the transport. Accordingly, the insulation characteristics may be modified several times during transport in response to the sensor measurements, prior to arriving at the destination location (block 518).

Figure 7:
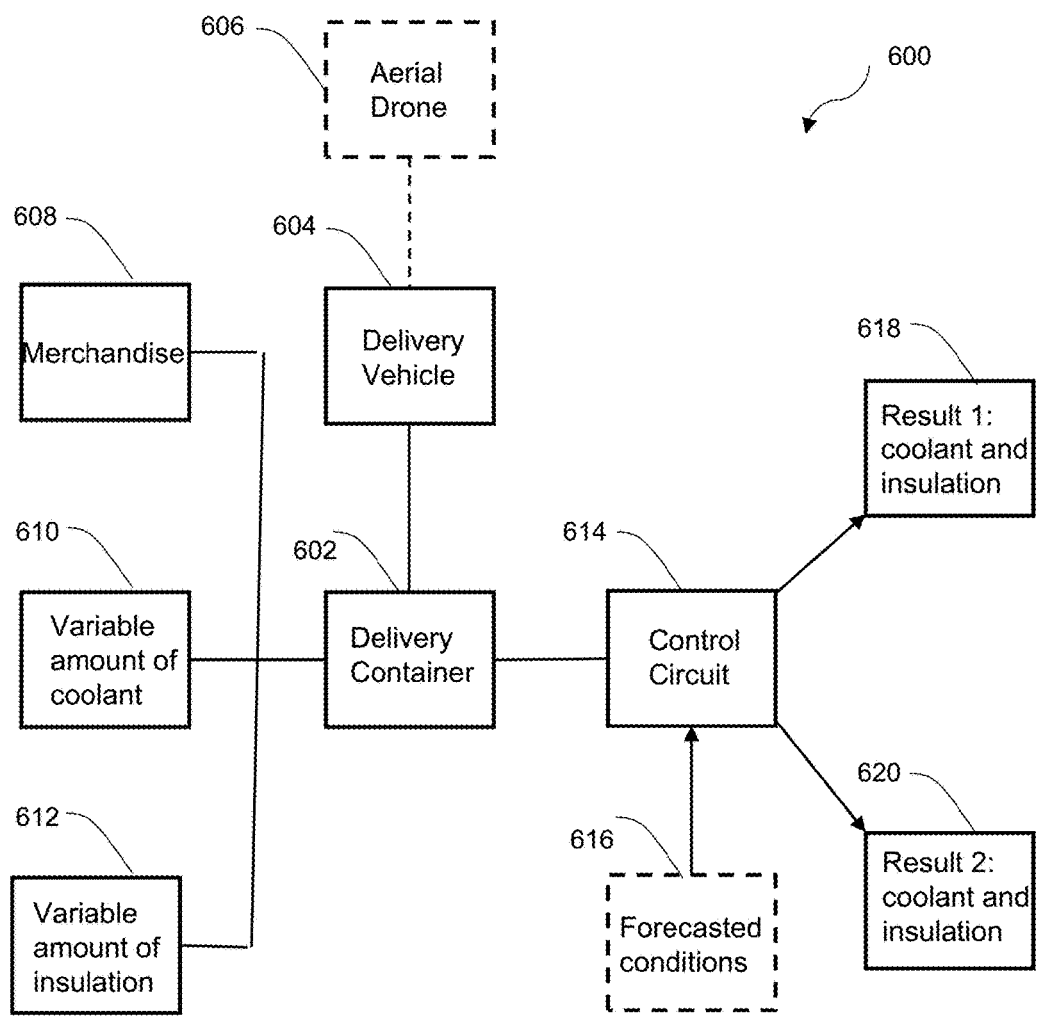
FIG. 7 is a block diagram of a system for transporting merchandise in accordance with some embodiments.

Referring to FIG. 7, there is shown a system 600 for transporting merchandise that may use one of the delivery containers 100, 200, 300 described above or one that is similar thereto. It is generally contemplated that the system 600 includes a merchandise storage area and an insulation compartment that can accommodate variable amounts of coolant and insulation. The system 600 generally involves the calculation of combinations of variable amounts of coolant and insulation prior to transport, and it is generally contemplated that one combination may be selected that suits the circumstances (such as taking into account the amount of coolant and/or insulation available to the user).

The system 600 includes a delivery container 602 that is transported in a delivery vehicle 604 along a delivery route from a source location to a destination location. In one form, it is contemplated that the delivery vehicle 604 may be an aerial drone 606. An aerial drone 606 may be subject to environmental conditions that may affect the transport of the merchandise 608 and the ability to maintain the merchandise 608 within the desired temperature range. Accordingly, it is contemplated that the calculation of several possible coolant and insulation combinations may be significant under such circumstances.

In one form, the delivery container 602 includes a merchandise storage area for holding the merchandise 608 and coolant 610 therein. The merchandise storage area is of a sufficient size to allow variable sizes of merchandise 608 and variable amounts of coolant 610 therein. In one form, the delivery container 602 also includes an insulation compartment adjacent the merchandise storage area of a sufficient size and/or flexibility for holding a variable amount of insulation 612 therein.

The system 600 also includes a control circuit 614 that is configured to calculate prior to transport a plurality of combinations of the amount of coolant 610 and the amount of insulation 612 required to maintain the merchandise 608 within the predetermined temperature range. As described above, the term control circuit refers broadly to any microcontroller, computer, or processor-based device with processor, memory, and programmable input/output peripherals, and accessory devices (including memory, transceivers for communication with other components and devices, etc.). Further, it is contemplated that the control circuit 614 is configured to access databases and other external sources to determine such information as forecasted environmental conditions 616 along the delivery route. As shown in FIG. 6, the control circuit 614 determines multiples possible combinations of coolant and insulation, including Result 1 (618) and Result 2 (620).

The calculations and combinations may be tailored to suit the particular circumstances and nature of the merchandise 608, coolant 610, insulation 612, and/or other factors. In one form, for example, the control circuit 614 may calculate a minimum amount of insulation required to maintain the merchandise 608 within the predetermined temperature range based on a predetermined type of insulation material and a predetermined amount and type of coolant. Further, the control circuit 614 may calculate the minimum amount of insulation required based on at least one of the physical size, weight, or thermal capacitance of the merchandise; the anticipated duration of transport; the mode of transport; and at least one forecasted environmental condition along the delivery route at the time of transport. It is contemplated that a user may select a combination of coolant and insulation that best suits the user's circumstances, such as based on the relative cost and/or availability of coolant and insulation.

In making these calculations, it is contemplated that a computing device may run an algorithm to determine how much coolant (such as dry ice) 610 and/or insulation 612 to add into the container 602. The computing device may be coupled to various databases to access requisite data, such as an order database, a product characteristic database and/or a customer database. By accessing these databases, the computing device may: (1) determine characteristics of the cold/frozen items to be maintained in a cold/frozen state, such as the physical size, weight, and thermal capacitance of items; (2) determine the duration of delivery, e.g., in hours;

(3) determine the amount of coolant and/or insulation required to maintain the temperature for the items for the duration; and (4) output this amount to a user who deposits the necessary amount of coolant and/or insulation into the delivery container/bag 602. So, for example, the control circuit may access an order database (to determine the product being ordered and the amount of product), may access a product characteristic database (to determine the physical characteristics of the product), and may access a customer database (to determine the destination location). Once the destination location is known, the computing device may calculate a delivery route and the duration of delivery. The computing device may also access additional databases (such as an environmental conditions database) for additional factors in calculating the amount of coolant and/or insulation.

Further, it is contemplated that the above factors may be inputted for an initial determination of coolant 610 and insulation 612 prior to transport and that the insulation characteristics may then be monitored and modified in real time during transport to address environmental conditions. For example, a user may use a computing device accessing various databases to input the product, product details (physical, thermal characteristics), delivery mechanism, exposure to elements, duration, trip details, current environment details, and container and variability parameters. The computing device may determine combinations of (1) amount of coolant 610 and (2) the insulation characteristics of the container 602 (e.g., the amount of insulation and/or the amount of air content in insulation portion) for a given container for that given product for that given trip for that given day. Then, after the start of transport, the insulation properties of the container 602 may be adjusted in response to actual real time environmental conditions, including uncontrolled/controlled, indirect/direct exposure to elements. So, it is contemplated that the real time systems and processes of 400 and 500 may be combined with the prior-to-transport system 600 and process 700.

Figure 8:
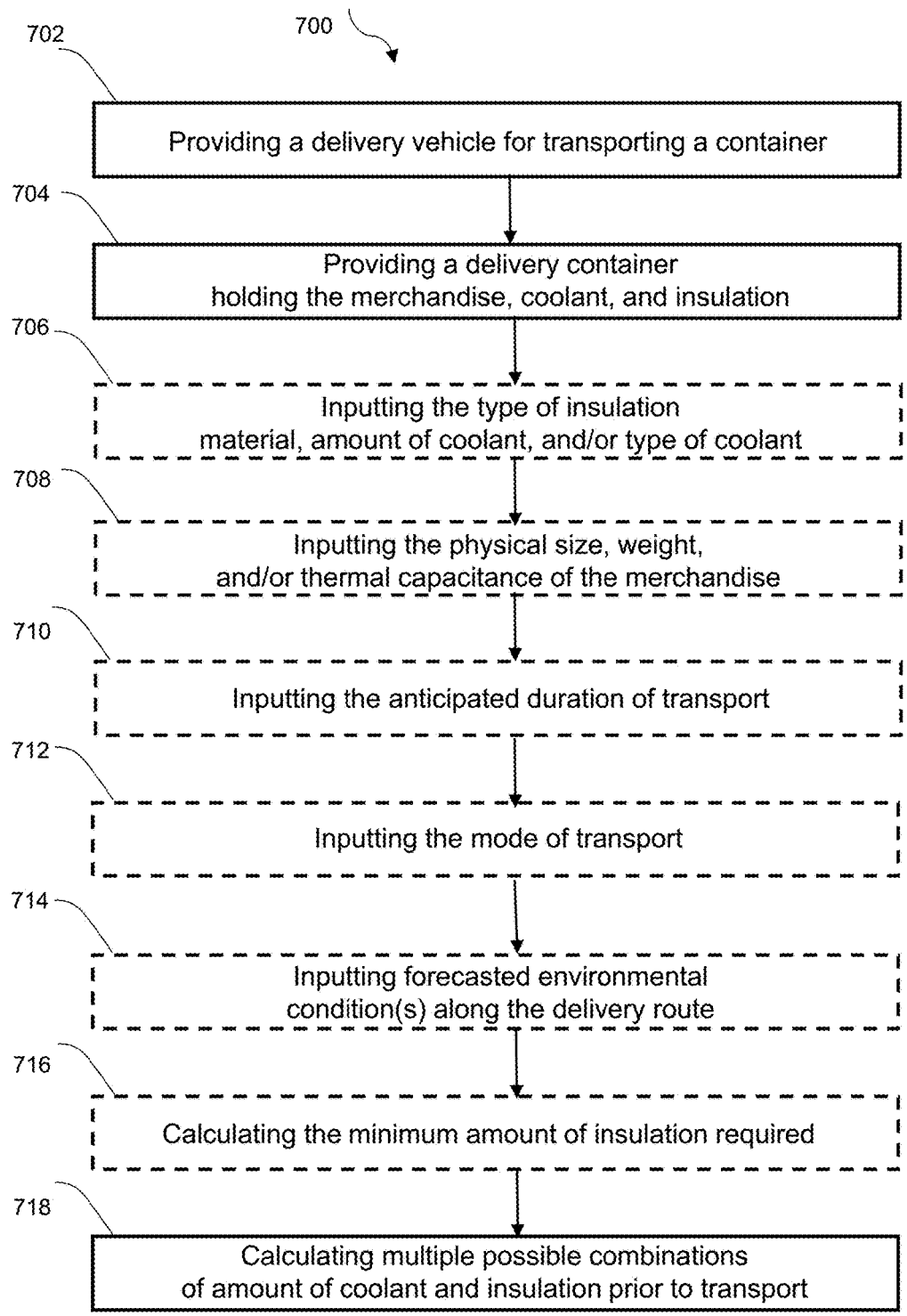
FIG. 8 is a flow diagram of a process for transporting merchandise in accordance with several embodiments.

In FIG. 8, there is shown a process 700 for transporting merchandise that may use the above-described systems and delivery containers. At blocks 702 and 704, a delivery vehicle and delivery container are provided. As above, in one form, it is contemplated that the delivery vehicle may be an aerial drone. Further, in one form, the delivery container may include a merchandise storage area that holds the merchandise and coolant and an insulation compartment that holds the insulation. It is contemplated that the merchandise storage area and insulation compartment are sufficiently sized to accommodate variable sizes and amounts of merchandise, coolant, and insulation.

At blocks 706-14, various factors relating to the merchandise, coolant, insulation, and delivery route may be inputted. At block 706, the user may input the type of insulation material, the amount of coolant, and/or the type of coolant. In one form, it may be desirable to be efficient in the amount of coolant used. Under this approach, an amount of coolant may be entered in order to make a determination of the minimum amount of insulation that may be required (block 716). At block 708, the physical size, weight, and/or thermal capacitance of the merchandise may be entered. At blocks 710 and 712, the anticipated duration of the transport and/or the mode of transport may be entered. At block 714, one or more environmental conditions along the delivery route forecasted during the transport period may be inputted.

At block 718, after the various factors are inputted, the control circuit calculates, prior to transport, multiple possible combinations of the amount of coolant and insulation that may be required. Various software applications may be used to make these calculations. The user may then select the combination of coolant and insulation that best satisfies the user's requirements, taking into account such factors as the cost and availability of different types of coolant and insulation materials.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for transporting merchandise using aerial drones comprising:
    an aerial drone configured to fly along a delivery route from a source location to a destination location and to transport a container therewith;
    a container configured to store and maintain merchandise within a predetermined temperature range in the aerial drone as the drone flies along the delivery route, the container comprising:
    a merchandise storage area configured to receive merchandise and a coolant;
    an insulation compartment adjacent the merchandise storage area;
    a first temperature sensor configured to measure a temperature in the merchandise storage area at predetermined time intervals during transport from the source location to the destination location;
    a second temperature sensor configured to measure a temperature outside of the container at predetermined time intervals during transport from the source location to the destination location;
    at least one valve operable during transport between an open position allowing air to flow from outside the container to inside the insulation compartment of the container and a closed position in which air flow from outside the container through the at least one valve is blocked; and
    a control circuit configured to:
    receive the temperature measurements from the first temperature sensor during transport and to modify insulation characteristics of the container during transport in response to the temperature measurements to maintain the merchandise within the predetermined temperature range;
    receive temperature measurements from the second temperature sensor during transport;
    compare temperature measurements of the first sensor with temperature measurements of the second temperature sensor; and
    modify insulation characteristics of the container during transport by allowing outside air into the container through the at least one valve if temperature measurements of the second sensor exceed temperature measurements of the first sensor taken over a predetermined number of time intervals.

2. The system of claim 1, wherein the container comprises:
    an outer bag with an interior divided into the merchandise storage area and the insulation compartment;
    an inner bag disposed within the interior of the outer bag and defining the merchandise storage area; and
    wherein the outer bag and the inner bag define the insulation compartment therebetween.

3. The system of claim 1, wherein the coolant comprises dry ice.

4. The system of claim 1, wherein the insulation compartment is configured to retain a variable amount of insulation.

5. The system of claim 1, wherein the insulation compartment is partially evacuated to create a partial vacuum.

6. The system of claim 5, further comprising a vacuum pump, wherein the control circuit is configured to:
monitor the temperature in the merchandise storage area; and
actuate the vacuum pump to modify the partial vacuum to modify the insulation characteristics of the insulation compartment during transport in response to the monitored temperature.

7. The system of claim 1, further comprising:
at least one sensor configured to measure environmental conditions outside the container during transport;
the control circuit configured to receive sensor measurements from the at least one sensor and to modify the insulation characteristics based on the sensor measurements.

8. The system of claim 7, wherein the environmental conditions comprise at least one of wind chill, heat index, amount of sunlight, elevation of route, humidity, and wind speed.

9. The system of claim 1, wherein the at least one valve comprises:
a uni-directional intake valve that is arranged to permit air flow into the container; and
a uni-directional exhaust valve that is arranged to permit air flow out of the container;
the control circuit configured to actuate the valves to modify the insulation characteristics of the container.

10. The system of claim 9, wherein:
the uni-directional intake valve is disposed on a first surface oriented facing a direction of travel to facilitate the intake of air through the intake valve; and
the uni-directional exhaust valve is disposed on a second surface oriented opposite the direction of travel to facilitate the exhaust of air through the exhaust valve.

11. A method for transporting merchandise using aerial drones comprising:
providing an aerial drone configured to fly along a delivery route from a source location to a destination location and to transport a container therewith;
providing a container configured to store and maintain merchandise within a predetermined temperature range in the aerial drone as the drone flies along the delivery route, the container comprising:
a merchandise storage area configured to receive merchandise and a coolant;
an insulation compartment adjacent the merchandise storage area;
the method comprising transporting the container in the aerial drone along the delivery route from the source location to the destination location;
by a first temperature sensor, measuring the temperature in the merchandise storage area at predetermined time intervals during transport from the source location to the destination location;
by a second temperature sensor, measuring a temperature outside of the container at predetermined time intervals during transport from the source location to the destination location;
providing at least one valve operable during transport between an open position allowing air to flow from outside the container to inside the insulation compartment of the container and a closed position in which air flow from outside the container through the valve is blocked;
by a control circuit,
receiving the temperature measurements during transport and modifying insulation characteristics of the container during transport in response to the temperature measurements to maintain the merchandise within a predetermined temperature range;
receiving temperature measurements from the second temperature sensor during transport;
comparing temperature measurements of the first sensor with temperature measurements of the second temperature sensor; and
modifying insulation characteristics of the container during transport by allowing outside air into the container through the at least one valve if temperature measurements of the second sensor exceed temperature measurements of the first sensor taken over a predetermined number of time intervals.

12. The method of claim 11, further comprising partially evacuating the insulation compartment to create a partial vacuum.

13. The method of claim 12, further comprising, by the control circuit:
monitoring the temperature in the merchandise storage area; and
actuating a vacuum pump to modify the partial vacuum to modify the insulation characteristics of the container during transport in response to the monitored temperature.

14. The method of claim 11, further comprising:
by at least one sensor, measuring environmental conditions outside the container during transport;
by the control circuit, receiving sensor measurements from the at least one sensor and modifying the insulation characteristics based on the sensor measurements.

15. The method of claim 14, wherein the environmental conditions comprise at least one of wind chill, heat index, amount of sunlight, elevation of route, humidity, and wind speed.

* * * * *